Oct. 10, 1950     I. N. VANT     2,524,860

MEAT GRINDER

Filed April 5, 1946

Inventor
Isadore N. Vant
by *A. A. McGrew*
His Attorney

UNITED STATES PATENT OFFICE 2,524,860

MEAT GRINDER

Isadore N. Vant, Chicago, Ill.

Application April 5, 1946, Serial No. 659,971

5 Claims. (Cl. 146—187)

This invention relates to material grinding apparatus and particularly to improvements in meat grinders of the type employed in meat markets and homes.

It is an object of this invention to provide a grinder including an improved arrangement for facilitating the passage of material through the feed passage to the grinding mechanism.

It is another object of this invention to provide a material grinder including an improved arrangement for facilitating the assembly of the moving parts and their removal for cleaning.

It is another object of this invention to provide a material grinder having an improved spring construction for retaining the grinding elements in engagement and alinement.

Further objects and advantages of this invention will become apparent as the following description proceeds and the features of novelty which characterize this invention will be pointed out with particularity in the claims annexed to and forming a part of this specification.

For a better understanding of the invention, reference may be had to the accompanying drawing in which.

Figure 1:
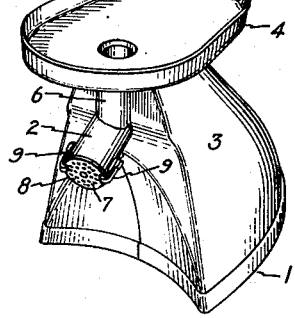
Fig. 1 is a perspective view of a grinder embodying the invention.

Referring now to the drawing, the grinder shown in Fig. 1 comprises a base 1 on which is supported a grinding device 2 driven by a suitable electric motor and gearing enclosed in a casing 3. Material, such as meat to be ground, is placed on a horizontal tray 4 and then fed to the grinding device through an opening 5 leading to the device through a duct 6. The ground material is discharged through openings 7 in a shear plate 8 secured to the discharge end of the grinding device by clamps 9. The grinder may be used in the conventional manner to grind meat as required. Small chunks of meat are placed in the tray 4 and the motor started; the meat is then fed by hand to the opening 5. The ground product is collected in a suitable container placed below the discharge end of the grinding device 2.

Figure 2:
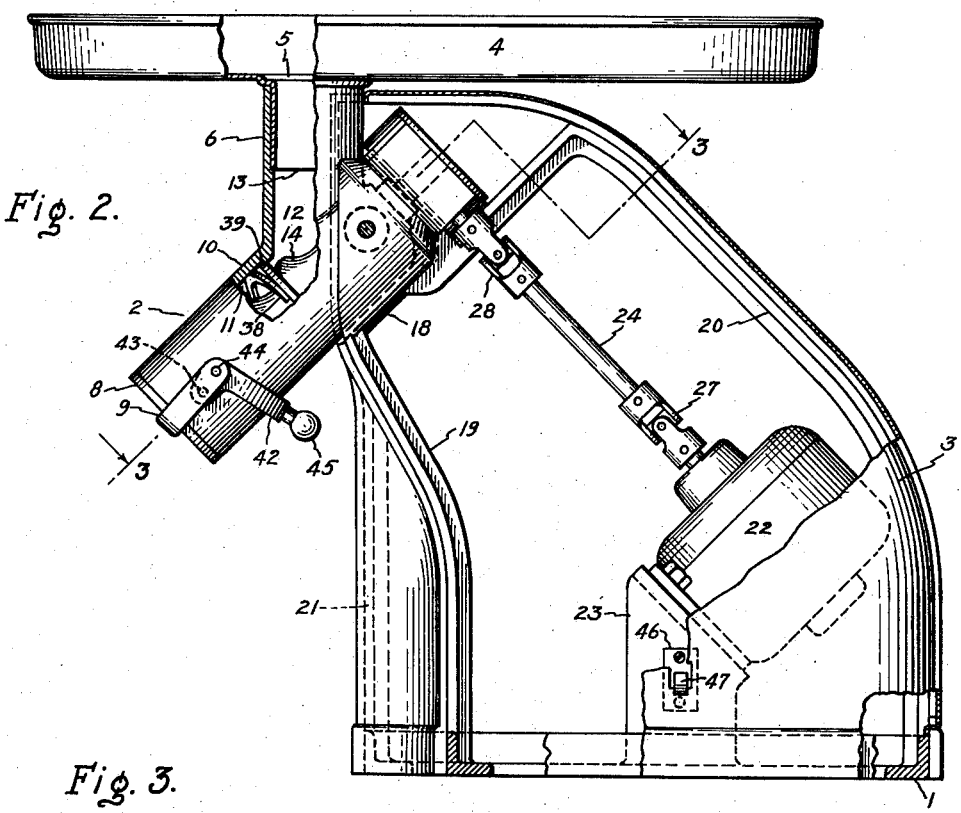
Fig. 2 is an enlarged side elevation, partly in section, of the grinder shown in Fig. 1.
Figure 3:
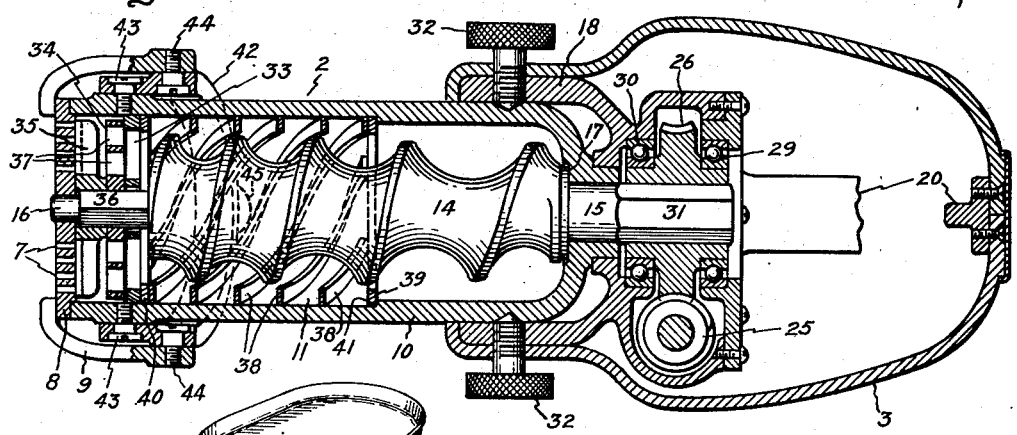
Fig. 3 is an enlarged sectional view along the line 3—3 of Fig. 2.

The details of construction of the grinder are shown in Figs. 2 and 3. The grinding device 2 comprises a housing 10 within which is formed a cylindrical passage 11 extending downwardly from an upwardly opening lateral feed inlet 12 to the open end of the passage which is the discharge outlet for the ground material. For reasons to be explained later, the housing is positioned so that the passage 11 slopes at an angle of about forty-five degrees. The material to be ground enters the inlet 12 through the duct 6 which is formed as a part of the housing 10. The pan 4 is provided with a downwardly opening sleeve or boss 13 which fits in the upper end of the duct 6, the pan resting on the duct walls and being readily removable. The material is moved from the inlet 12 toward the outlet by a feed screw 14 having journal bearings 15 and 16 in the end of the housing and in the plate 8, respectively. The thrust of the screw is taken up by a thrust bearing 17 adjacent the journal bearing 15.

The housing 10 is removably mounted in a frame 18 rigidly supported on the base 1 by central frame members 19 and 20 at the front and rear of the grinder and by lateral frame members 21 on either side of the front member 19. The casing 3 is secured on the frame members and encloses an electric driving motor 22. The motor is rigidly mounted on the base 1 by means of a supporting bracket 23, and is connected to drive the screw 14 through a shaft 24 and a worm 25 and gear 26. Universal couplings 27 and 28 are provided to connect the shaft 24 to the motor and worm, respectively, and the gear 26 is mounted in ball bearing assemblies 29 and 30. The screw 14 is provided with a hexagonal shaft extension 31 which is axially slidable in a complementary opening in the gear 26. The housing 10 may be removed by loosening set screws 32 and then withdrawing the housing assembly, the shaft extension 31 sliding out of engagement with the gear 26. Thus the entire grinding device may be removed easily for cleaning or repair without disturbing the motor and driving mechanism.

The grinding device includes a plurality of cutting elements 33, 34 and 35, in addition to end plate 8. All these elements are slidable axially in the passage 11; the element 33 is keyed to the housing 10 in any suitable manner to prevent its rotation, while the elements 34 and 35 are mounted on a square portion 36 of the shaft of the screw and rotate with the screw. Two sets of cooperating cutters are thus provided; the first set comprising the elements 33 and 34 and the second set the element 35 and the shear plate 8.

The element 34 is a shear plate having holes 37 which preferably are considerably larger than the holes 7 in the plate 8. The elements 33 and 35 are provided with a plurality of cutting blades, the edges of which engage the surfaces of the plates 34 and 8.

The several elements are held in alined engagement and wear is taken up by a plurality, here shown as three high pitch spiral springs 38 of rectangular cross section. The springs are equally spaced about the periphery of the passage 11 and are held in compression between rings 39 and 40 which preferably are formed integrally with the springs. The ring 39 rests against a shoulder or stop 41 formed in the walls of the passage 11 near the inlet and the ring 40 rests against the non-rotatable cutting element 33; it will thus be apparent that the springs maintain pressure to urge the cutting elements together and keep them in alinement. For a more complete description of the arrangement of the cutting elements, reference may be had to the present inventor's Patent No. 2,090,650, issued on August 24, 1937.

The springs 38 not only retain the cutting elements in position, but also impart a spiral movement to material passing through the passage 11, and due to the contour differences, a precutting and positive feeding is attained; this makes it unnecessary to provide the usual spiral flutes or guides in the walls of the passage. This construction greatly facilitates the cleaning of the grinder because the springs may be removed leaving the smooth cylindrical walls for cleaning. The housing also is simple to manufacture. When the grinder is being assembled, the ring 39 and springs 38 are placed in position against the shoulder 41 and the screw 14 is inserted in its operating position; the springs are then compressed and if the ring 40 is a separate piece it is placed over the ends of the springs and cutting elements 33, 34 and 35 are fitted in place in the passage 11. The plate 8 is then pressed into position and the clamps 9 are set to hold the plate rigidly. The clamps 9 are actuated by a U-shaped overcenter lever 42 pivoted on the two sides of the housing 10 on screws 43. The clamps 9 are pivoted by screws 44 on the elbows of the lever so that when the lever is in its clamping position as shown, the pivot 43 is overcenter with respect to the center line of the clamps 9, in which position the housing prevents further rotation of the lever crank. This locks the clamps in position to hold the plate 8 rigidly against the open end of the housing. A knob 45 is provided to facilitate movement of the lever. It is thus apparent that the plate 8 may be detached quickly and all the moving parts of the grinding device readily removed at the end of the grinding operation.

It was pointed out above that the housing 2 is positioned so that the longitudinal axis of the cylindrical passage 11 extends at an angle of about forty-five degrees to the horizontal. With the axis inclined in this manner, the force of gravity is available to assist the movement of the material through the grinder. Furthermore, the duct 6 is cylindrical and extends vertically from the lateral inlet 12, so that chunks of meat or other material move through the duct 6 by gravity and do not tend to jam and produce air pockets as material is withdrawn from the bottom; this overcomes a difficulty frequently met with the conventional feed hopper. The operation resulting from the use of the force of gravity in this manner is greatly increased speed of the grinding operation, all material tending to move through the vertical duct and feed passages, so that the operation of the feed screw is rendered more effective.

Similarly, the gravitational discharge provided by the 45° arrangement also serves to bring the "strings" of hamburger out of the end plate without crushing or mashing as frequently happens with machines employing a horizontal discharge. As a consequence, a more attractive product is attained. The design and arrangement of the chopper housing provides a more sanitary cleaning action, as the removal of the spring assembly leaves only a smooth cylindrical passage within the casing which is easily cleaned.

The entire unit is self-contained, a suitable electric cable (not shown) is provided for plugging the motor to the power supply. A manual motor control switch is mounted on the bracket 23 as indicated at 46 and with its operating tumbler or knob 47 accessible from outside the casing 4.

While the invention has been described in connection with a specific portable grinder, other applications will readily be apparent to those skilled in the art. It is, therefore, not desired that the invention be limited to the particular construction illustrated and described and it is intended by the appended claims to cover all modifications within the spirit and scope of the invention.

What I claim and desire to secure by Letters Patent is:

1. A grinder comprising a housing provided with a passage having a feed inlet and a discharge outlet, spiral screw means for moving material along said passage from said inlet toward said outlet, grinding means adjacent said outlet and including a rotatable cutting member and a non-rotatable cutting member, said non-rotatable member being axially movable in said passage, means for retaining said members in said passage, means providing a stop in said passage facing said outlet at a substantial distance therefrom, and a plurality of removable spiral springs of equal pitch wound oppositely of said screw mounted in compression between said stop and said non-rotatable member and equally spaced about the circumference of said passage for urging said members into engagement and for imparting spiral movement to material passing through said passage.

2. A grinder comprising a frame, power driving means mounted on said frame, a housing removably mounted on said frame and provided with a cylindrical passage having a lateral feed inlet near one end and an axial discharge outlet at the other end thereof, a rotatable screw for moving material through said passage from said inlet toward said outlet, means removably secured to the outlet end of said housing for providing a bearing for said screw and having openings affording discharge of material from said passage, axially movable grinding elements mounted in said passage near the discharge end thereof, one of said elements being secured against rotation in said housing and another of said elements between said one element and said bearing being secured for rotation with said screw, means providing a shoulder in said passage near said inlet and facing the discharge end of said passage, a spiral spring arranged between said shoulder and said one element for urging said elements into engagement and for imparting spiral movement to material passing through said passage and quick attaching means for locking said rotatable screw to said driving means when the housing is mounted on said frame.

3. A grinder comprising a frame a housing removably mounted on said frame provided with a passage having a feed inlet and a discharge outlet, means for moving material along said passage from said inlet toward said outlet, grinding means adjacent said outlet and including a rotatable cutting member and a non-rotatable cutting member, said non-rotatable member being axially movable in said passage, means for retaining said members in said passage, means providing a stop in said passage facing said outlet at a substantial distance therefrom, and a spiral spring engaging said stop and said non-rotatable member for urging said members into engagement and for imparting a spiral movement to material passing through said passage, said grinding means and said retaining means and said spring being readily removable through the discharge outlet of said housing and said housing being readily removable from said frame to facilitate cleaning of said grinder.

4. A grinder comprising a housing providing a passage having a feed inlet and a discharge outlet, means for moving material from said inlet toward said outlet, a shear plate arranged to fit against the outside of said housing over said outlet, a releasable clamping means inclusive of a yoke having dogs on the opposite ends thereof for securing said plate rigidly in position against said housing, grinding means including a cutting member mounted in said housing adjacent said plate, and means including a spring within said passage of greater diameter than and surrounding a portion of the material moving means for urging said cutting member into engagement with said plate.

5. A grinder comprising a housing providing a cylindrical passage having a lateral feed inlet and an axial discharge outlet, means for moving material from said inlet to said outlet, a shear plate having discharge openings therein and arranged to fit against said housing over said outlet, a quick release clamping device including a yoke pivoted on said housing having dogs on the opposite ends thereof to form an overcenter lever arranged to hold said shear plate rigidly in place against said housing, grinding means mounted in said housing adjacent said plate, and means including a spiral spring having annular rings at its opposite ends extending about the periphery of said passage substantially from said inlet to said grinding means for maintaining said grinding means in position and for imparting spiral movement to material passing from said inlet toward said grinding means, said spring, rings and said grinding means being readily removable upon release of said overcenter lever.

ISADORE N. VANT.

REFERENCES CITED

The following references are of record in the file of this patent:

UNITED STATES PATENTS

| Number | Name | Date |
|---|---|---|
| 359,837 | Bell | Mar. 22, 1887 |
| 1,160,955 | Peoples et al. | Nov. 16, 1916 |
| 1,457,910 | Loichot | June 5, 1923 |
| 1,545,514 | Pfouts | July 14, 1925 |
| 1,675,067 | Tschantz | June 26, 1928 |
| 1,780,914 | Gullberg | Nov. 11, 1930 |
| 2,038,731 | Gunderson | Apr. 28, 1936 |
| 2,090,650 | Vant | Aug. 24, 1937 |
| 2,181,780 | Braun | Nov. 28, 1939 |
| 2,275,516 | Engelsted | Mar. 10, 1942 |

FOREIGN PATENTS

| Number | Country | Date |
|---|---|---|
| 394,973 | France | Dec. 14, 1908 |
| 31,601 | Germany | May 29, 1885 |
| 625,719 | Germany | Feb. 14, 1936 |